United States Patent [19]

Mead et al.

[11] 4,117,212
[45] Sep. 26, 1978

[54] LITHIUM-IODINE BATTERY

[75] Inventors: Ralph T. Mead, Kenmore; Frank W. Rudolph, Depew; Norbert W. Frenz, Jr., North Tonawanda; Wilson Greatbatch, Clarence, all of N.Y.

[73] Assignee: Wilson Greatbatch Ltd., Clarence, N.Y.

[21] Appl. No.: 847,769

[22] Filed: Nov. 2, 1977

[51] Int. Cl.$^2$ .............................................. H01M 6/18
[52] U.S. Cl. ................................... 429/153; 429/199; 429/213; 429/218
[58] Field of Search ............... 429/153, 191, 192, 199, 429/213, 218, 212, 163

[56] References Cited

U.S. PATENT DOCUMENTS

| 3,660,163 | 5/1972 | Moser | 429/213 X |
| 3,674,562 | 7/1972 | Schneider et al. | 429/213 X |
| 3,723,183 | 3/1973 | Greatbatch | 429/191 X |
| 4,049,890 | 9/1977 | Schneider | 429/213 |

Primary Examiner—Anthony Skapars
Attorney, Agent, or Firm—Christel & Bean

[57] ABSTRACT

A lithium-iodine cell comprising a region of iodine-containing cathode material having at least two surface portions, a current collector element operatively contacting one of the surface portions and a lithium anode element operatively contacting the other cathode surface. The lithium anode element is embraced by a holder in a manner exposing a surface of the element to the cathode material and sealing the corresponding anode current collector element from exposure to the cathode material, the holder being of a material which does not exhibit electronic conduction when exposed to iodine. The anode and cathode current collectors have extending lead portions, and the cathode lead is insulated from the lithium anode element. A pair of cells are combined, being heat sealed together around the peripheries, with the corresponding cathode regions contacting opposite surfaces of a separator sheet to form a battery.

15 Claims, 2 Drawing Figures

LITHIUM-IODINE BATTERY

BACKGROUND OF THE INVENTION

This invention relates to the conversion of chemical energy to electrical energy, and more particularly to a new and improved construction for lithium iodine cells.

One area of use of the present invention is in providing electrical power safely to inaccessible devices in the human environment, for example to an implanted cardiac pacemaker, although the principles of the present invention can be variously applied. The lithium-iodine cell is used with implantable cardiac pacemakers and advantageously has an open circuit voltage about twice that of the mercury cell, does not generate gas during operation, and has a non-corrosive electrolyte.

A cell has been proposed including a lithium anode and a charge transfer complex of an organic donor component and iodine. When more than one cell is needed for certain voltage requirements, providing such a battery for human implantation gives rise to size and capacity considerations. In particular, such a battery must be relatively small in size to be suitable for implantation while at the same time having a relatively larger lithium area to give a longer voltage output. Along with these requirements, each cell should be constructed in a manner preventing an internal electrical short circuit arising from migration or flow of the iodine-containing cathode material. In addition, such a battery desirably will be relatively easy to fabricate.

SUMMARY OF THE INVENTION

It is, therefore, an object of this invention to provide a new and improved construction for a lithium-iodine cell.

It is a further object of this invention to provide a new and improved construction for a lithium-iodine battery including a plurality of cells.

It is a more particular object of this invention to provide a lithium-iodine cell construction having a relatively large lithium area therein and relatively small overall outer size.

It is a further object of this invention to provide such a cell construction which also constrains migration of the iodine material thereby avoiding an internal electrical short circuit in the cell.

It is a further object of this invention to provide such a cell and battery construction which can be fabricated relatively quickly and easily.

The present invention provides a lithium-iodine cell comprising a region of iodine-containing cathode material having at least two surface portions, a current collector element operatively contacting one of the surface portions and a lithium anode element operatively contacting the other cathode surface. The lithium anode element is embraced by a holder in a manner exposing a surface of the element to the cathode material and sealing the corresponding anode current collector element from exposure to the cathode material, the holder being of a material which does not exhibit electronic conduction when exposed to iodine. The anode and cathode current collectors have extending lead or conductor portions, and the cathode lead is insulated from the lithium anode element. A pair of cells are combined with the corresponding cathode regions contacting opposite surfaces of a separator sheet to form a battery.

The foregoing and additional advantages and characterizing features of the present invention will become apparent upon a reading of the ensuing detailed description together with the included drawing wherein:

BRIEF DESCRIPTION OF THE DRAWING FIGURES

FIG. 1 is a sectional view of a lithium-iodine battery according to the present invention; and FIG. 2 is a sectional view of a lithium-iodine battery according to another embodiment of the present invention.

DETAILED DESCRIPTION OF ILLUSTRATED EMBODIMENTS

Figure 1:
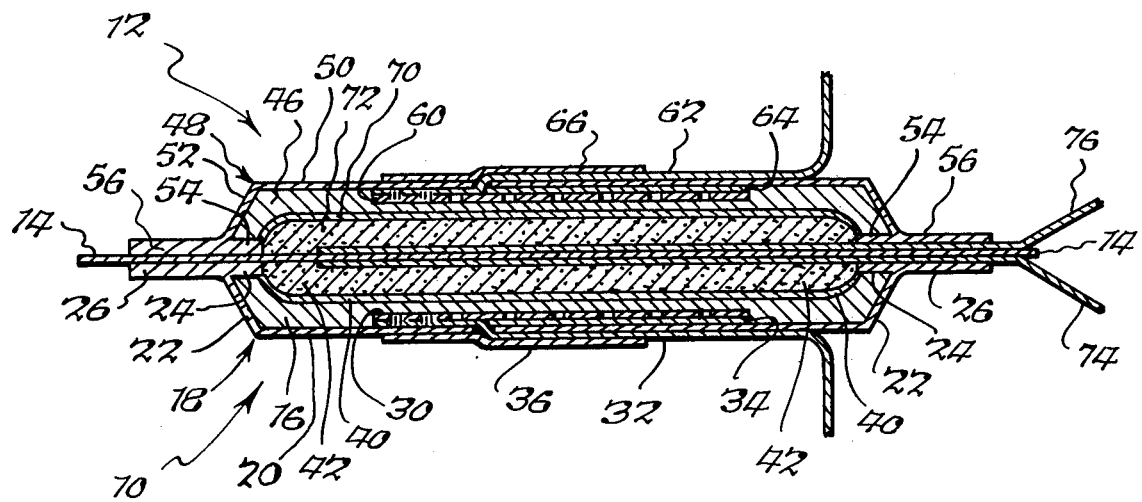

Referring now to FIG. 1, a lithium-iodine battery according to the present invention includes two electrically independent cells, designated 10 and 12, separated by a separator sheet 14 of a material which is electrically insulating and which does not exhibit electronic conduction when exposed to iodine. The separator 14 will be described in further detail presently. The lithium-iodine cell 10 comprises a lithium anode element 16 of generally cup-like shape including a generally planar base portion and a circumferential rim portion extending therefrom, in particular a generally disc-shaped base portion and an annular rim portion which extends from the base portion at an acute angle with respect thereto. The lithium anode element 16 has oppositely-directed surfaces, and an anode container or holder 18 embraces the lithium anode element 16 in a manner exposing one surface of the lithium element and contacting the other surface thereof. In particular, holder 18 is generally cup-like in shape having a disc-shaped generally planar base portion 20, a rim portion 22 extending from the base portion and disposed at an acute angle relative to the plane of the base portion, and a circumferential flange having both radially inward and radially outward extending portions 24 and 26, respectively. Holder 18 is of a material which does not exhibit electronic conduction when exposed to iodine, and materials found to satisfy this requirement are, for example, fluoropolymer materials available commercially from the Allied Chemical Company under the trademark Halar and from the DuPont Company under the trademark Tefzel.

The cup or holder 18 can be formed in various ways such as a single-stage molding operation or, alternatively, by providing or forming a cup having a shape like that shown in FIG. 1 with base 20, rim 22 and the outwardly extending flange 26 all of the same or uniform thickness but without the inwardly extending flange portion 24 and then sealing a disc to the cup, by heat or otherwise, the disc having an outer diameter equal to the outer diameter of flange portion 26, a thickness substantially equal to the desired thickness of flange portion 24 and being of the same material as that of the rest of cup 18, i.e., the aforementioned Halar or Tefzel material. As a result, the outer flange portion would have a thickness greater than that of the inner flange portion, so an appropriate pressing or forming operation under heat conditions would be employed to form the flange portions of the same thickness. Then the center of the disc is cut out to result in the desired radial dimension of the flange portion 24. According to an alternative method, an annular ring can be provided having an outer diameter equal to the outer diameter of the flange portion 26, a thickness substantially equal to the desired thickness of the flange portion 24, and an inner diameter of a size providing the desired radial dimension of the flange portion 24. The cup and ring are then pressed together and subjected to heat in a known manner to provide a fused or molded assembly, and the thicknesses of the inner and outer flange portions can be controlled by suitable control of the pressing operation. The annular ring would be of the same material as that of the remaining portion of cup 18, in particular the aforementioned Halar or Tefzel materials.

The cell of the present invention further comprises anode electrical conductor means operatively connected to the lithium anode element 16. In particular, an anode current collector element 30 is positioned between the lithium element 16 and the inner surface of base portion 20 of holder 18 as shown in FIG. 1. An anode lead 32 is joined at one end such as by welding to current collector 30 and extends therefrom through a slot or opening provided in the base portion 20 of holder 18 and lies along the outer surface of holder 18 as shown in FIG. 1. The method of assembly is performed in the following manner. By way of illustration, current collector 30 is of No. 12 zirconium mesh, circular in shape, and lead 32 can be a thin strip of zirconium welded at one end to the mesh. The other or free end of the lead 32 is drawn through the slit in the base 20 of holder 18 in a manner drawing or pulling the current collector 30 toward and against the surface of the base 20. A thin, disc-shaped lithium element 34 is placed between collector 30 and the surface of base 20 as collector 30 is drawn tightly toward base 20. The button-like element 34 is relatively small in size and positioned so that one edge portion abuts lead 32 and the opposite edge portion coincides with an edge portion of collector 30 as shown in FIG. 1. A seal or patch 36 is placed over the outer surface of holder 18 around the slit or opening and over the corresponding portion of lead 32, being secured thereto by a suitable cement. Seal 36 is of a material which is non-reactive with iodine, preferably the aforementioned Tefzel material, and a preferred form of cement is a fast-setting type which prevents migration of iodine therethrough such as the cyanoacrylate cement commercially available from Techni-Tool, Inc., under the designation Perma-Bond 101.

After the anode holder and current collector assembly is formed, the lithium element 16 is added to the combination in the following manner. The lithium element initially is generally disc-shaped and is placed in holder 18 against collector 30 and the inner surface of the base 20 whereupon the entire combination is placed in a mold or other suitable holding fixture and then pressure is applied by suitable means to the exposed face of the lithium element in a manner forming or extruding it along the inner surface or rim portion 22 until the peripheral edge of the lithium element contacts or abuts the inner surface of flange portion 24 to form the lithium element 16 conforming to the shape of the cup 18 as shown in FIG. 1. The shape is, of course, determined by the original dimensions of the lithium element and by the amount of pressure which is applied. The material of holder 18 should be pressure bondable to lithium, this being a characteristic of the aforementioned Halar and Tefzel materials, and by virtue of the pressure forming operation, the inner surface of the lithium element is bonded or sealed to the inner surface of holder 18 in a manner sealing current collector 30 therein and protecting it against migration of any of the iodine-containing material of the cathode. The nature of the cathode material will be described in further detail presently. The seal between the lithium element and the inner flange prevents migration or flow of cathode material between the inner surface of the anode holder and the back surface of the lithium element where the anode collector is located. The pressure forming operation also causes a bonding of the lithium button 34 to the adjacent surface of base 20 in a manner sealing the region adjacent the opening or slit therein. It also causes the button 34, in conjunction with the lithium element 16, to embed the corresponding region of the anode current collector 30. This, in turn, overcomes or minimizes any tendency of the lithium element 16 to separate from the collector 30 during the life of the cell.

The lithium anode element 16 is provided with a coating 40 on the exposed surface thereof, i.e., the surface which will be operatively associated with cathode material. The coating 40 is of an organic electron donor component material, for example poly-vinyl pyridine, and a preferred method of forming the coating will be described in detail presently.

The lithium iodine cell of the present invention further includes cathode means comprising cathode material 42 in the form of a charge transfer complex of an organic electron donor material and iodine. The organic material should be an electron donor and can be any organic compound having a double bond or an amine group. An electron donor gives the iodine sufficient conductivity for proper cell operation. A preferred organic material is two-vinyl pryidine polymer. The cathode material 42 is prepared by heating the organic material, i.e., two-vinyl pyridine, mixed with iodine, to a temperature greater than the crystallization temperature of iodine. The amount of iodine should be greater than about 50% by weight of the resulting mixture so that enough iodine is available in the cathode material 30 to provide sufficient conductivity for proper cell operation.

The resulting mixture is a viscous, flowable substance which is combined with the anode to form the cell in the following manner. A subassembly comprising lithium element 16, anode holder 18, current collector 30 and lead 32 is supported or otherwise held an upright position similar to that shown in FIG. 1 whereupon the material 42 is poured therein up to a level flush with the upper surface of the peripheral flange. A cathode current collector can be placed in contact with the exposed surface of the cathode material which then is allowed to cool to a non-flowable or substantially solid condition for ease in handling. The nature of the cathode current collector and manner of assembly will be described in further detail presently.

The lithium iodine cell herein designated 12 is electrically independent of cell 10 but is of the same construction and size as that of cell 10 and fabricated or assembled in a manner identical to that of cell 10. Thus, cell 12 includes a lithium anode element 46 in a cup-shaped anode holder or containter 48 identical in structure and material to holder 18 and including a disc-shaped base portion 50, an annular rim portion 52 extending from the base portion and disposed at an acute angle relative to the plane of base 50, and a circumferential flange having inwardly and outwardly radially extending portions 54 and 56, respectively.

Cell 12 further comprises an anode current conductor 60 and lead 62 which are incorporated in the assembly together with a lithium bottom 64 and a seal or patch 66 in a manner identical to that of the corresponding components in cell 10. Lithium element 46 is formed in the assembly in a manner identical to that of lithium element 16 and is provided with a coating 70 on the exposed surface thereof identical to coating 40.

Cell 12 further includes cathode means comprising cathode material 72 in a form of a charge transfer complex of organic donor material and iodine identical to cathode material 42 of cell 10. The cathode material 72 of cell 12 is prepared and introduced to cell 12 in a manner identical to that of cathode material 42 of cell 10.

The material of each anode coating 40, 70 is an organic electron donor material of the group of organic compounds known as charge transfer complex donors. The material of the coatings can be the organic donor used in preparing the charge transfer complex of the cathode material, but other materials can be employed. A preferred material for each coating is polyvinyl pyridine and it is applied to the exposed surface of each lithium element 16, 46 in the following manner. A solution of two-vinyl pyridine polymer in anhydrous benzene or other suitable solvent is prepared. The two-vinyl pyridine is readily commercially available. The solution is prepared with two-vinyl pyridine present in a range from about 10% to about 20% by weight with a strength of about 14% by weight of two-vinyl pyridine being preferred. While two-vinyl pyridine, four-vinyl pyridine and three-ethyl two-vinyl pyridine can be used, two-vinyl pyridine is preferred because of its more fluid characteristics. When the solution is prepared at a strength below about 10% the resulting coating can be undesirably too thin, and when the solution is prepared at a strength greater than about 20% the material becomes difficult to apply. The solution is applied to the exposed surface of each lithium plate in a suitable manner, for example simply by application with a brush. The presence of the anhydrous benzene serves to exclude moisture thereby preventing any adverse reaction with the lithium plate. The coated anode then is exposed to a desiccant in a manner sufficient to remove the benzene from the coating. In particular, the coated anode is placed in a chamber with barium oxide solid material for a time sufficient to remove the benzene, which can be in the neighborhood of 24 hours.

The two cells 10, 12 are joined with respective current collectors and separated by sheet 14 to form a battery in the following manner. A current collector lead element 74 of platinum or other suitable metal is placed in contact with the cathode material 42 of cell 10. Lead 74 is of sufficient length to extend outwardly beyond flange portion 26. Similarly, a current collector lead element 76 of platinum or other suitable metal is placed in contact with the cathode material 72 of cell 12. Lead 76 is of sufficient length to extend outwardly beyond flange portion 56. Cells 10 and 12 are placed against opposite surfaces of sheet 14 with current collectors 74 and 76 contacting opposite surfaces of sheet 14. If desired, the portions of collectors 74, 76 in contact with respective cathode material can be of enlarged area, and the outwardly extending portions of collectors 74, 76 can be elongated and relatively narrow in the shape of electrical leads.

The resulting assembly is subjected to pressure and heat applied to the peripheral flanges in a manner heat sealing the two cells together. The peripheral flanges 26 and 56 of the holders 18 and 48, respectively, therefore must be of a material which is heat sealable, and this requirement is satisfied by the aforementioned Halar material. The aforementioned Tefzel material also can be employed. The separator sheet 14 should be of the same material as the peripheral flanges 26, 56 for good bonding therebetween. An illustrative arrangement for heat sealing the cell assemblies together includes a first cup-shaped holding fixture disposed horizontally with the open end facing up and supported on the upper end of a vertically disposed rod and a heating device including a moveable, ring-shaped heated platen movably positioned in co-axial relationship with the supporting rod. A second cup-shaped holding fixture is disposed horizontally, vertically spaced from the first cup in alignment therewith, and having the open end facing down. The second fixture is supported on the lower end of a vertically disposed rod, and a heating device including a moveable, ring-shaped heated platen is movably positioned in co-axial relationship with the supporting rod. Thus, the upper and lower fixture-heater combinations are positioned in spaced-apart, axial alignment.

The combination of cells 10, 12 placed against opposite surfaces of sheet 14 with current collectors 74, 76 contacting opposite surfaces of sheet 14 is positioned in the lower holding fixture. In particular, it may be desirable first to place a thin parting sheet on the lower cup-shaped fixture to prevent the material of the cell holder or cup 18 from adhering to the heated platens. The sheet can have a thickness of about 0.003 inch and be a polyimide film material available from the DuPont Company under the registered trademark Capton. When in position, the base portion 20 of holder 18 contacts the upper surface of the parting sheet, and the downwardly facing cup-shaped body portion of holder 18 is in alignment with the upwardly facing cup-shaped recess or interior of the lower holding fixture. Another parting sheet can be placed over the combination in contact with the base portion of holder 48.

One or more of the upper and lower fixture-supporting rod combinations is mounted for relative axial movement, and by virtue of this arrangement the fixtures are moved toward each other in a manner firmly clamping or otherwise holding the combination of the cell assemblies therebetween. The cup-shaped body portion of cell 10 fits into the cup-shaped interior recess of the lower fixture with the one parting sheet therebetween, and the cup-shaped body portion of cell 12 fits into the cup-shaped interior recess of the upper fixture with the parting sheet therebetween. The heaters are placed in operation and the ring-shaped platens are moved into contact with the opposite surfaces of the peripheral flanges of the combination of the cell assemblies in a manner applying heat and pressure to the flanges. By way of illustration, heat is applied at a temperature of 495° F. ± 5° F., pressure is applied at a force of 60 pounds ± 10 pounds, and the application of heat and pressure is done for about 1.5 minutes and in a manner sealing the composite peripheral flange of the two cells to a selected thickness which is determined by controlling the relative movement of the heated platens by suitable mechanical stops.

The rods supporting the cup-like holding fixtures can include conduits for transmitting low temperature fluid, for example at a temperature of about 20° F. ± 5° F., for refrigerating the cups to prevent melting and flowing of the cathode material during the heat sealing operation. Upon completion of the heat sealing operation, the heated platens are moved out of contact with the cell combination to allow the heat sealed flange to cool, and the holding fixtures continue to clamp or grasp the cell combination during cooling. Thereafter the holding cups are moved to release the cell combination and the parting sheets are removed. The resulting assembly is similar to that shown in FIG. 1, and the peripheral flange can be trimmed if desired.

The lithium-iodine battery of the present invention operates in the following manner. As soon as the iodine-containing cathode material 42 and 72 in each cell operatively contacts the lithium elements 16 and 46, respectively, lithium-iodine electrolytes begin to form at the interfaces between material 42 and element 16 and between material 72 and element 46. Electrical potential differences exist between anode lead 32 and cathode lead 74 and between anode lead 62 and cathode lead 76. The lithium-iodine battery provides an output voltage of about 5.6 volts when the cells 10, 12 are connected electrically in series.

The resulting combination of cells 10, 12 separated by sheet 14 with cathode current collectors 74, 76 contacting opposite surfaces of sheet 14 advantageously provides two electrically independent cells of relatively simple construction by a convenient method of fabrication. The method as described above includes a one step heat sealing operation after cells 10, 12 are combined with separating sheet 14. The cups 18, 48 and separator 14 are sealed together around the periphery of the combination.

The coatings 40 and 70 on lithium elements 16 and 46, respectively, perform several important functions. One is a desirable reduction in cell impedance believed to result from a better and improved electrically effective contact area between the cathode material and each lithium anode element. In particular, when iodine-containing cathode material at an elevated temperature comes into contact with an uncoated lithium surface, there can be some immediate recrystallization of iodine on the lithium surface thereby blocking or preventing operative contact at that point between the lithium element and the complex of organic material and iodine. Coatings 40, 70 serve as protective coatings to prevent this problem, functioning as buffers between the pure lithium plates and the relatively hot cathode material as it contacts the plates. There may be other mechanisms involved in the improvement of performance resulting from the use of these coatings. As a result, there is provided a greater utilization of the surface of each lithium anode element by the cathode material. In addition, the protective coatings 40, 70 permit a relatively longer handling time during construction of the cell prior to introducing the hot cathode material.

Figure 2:
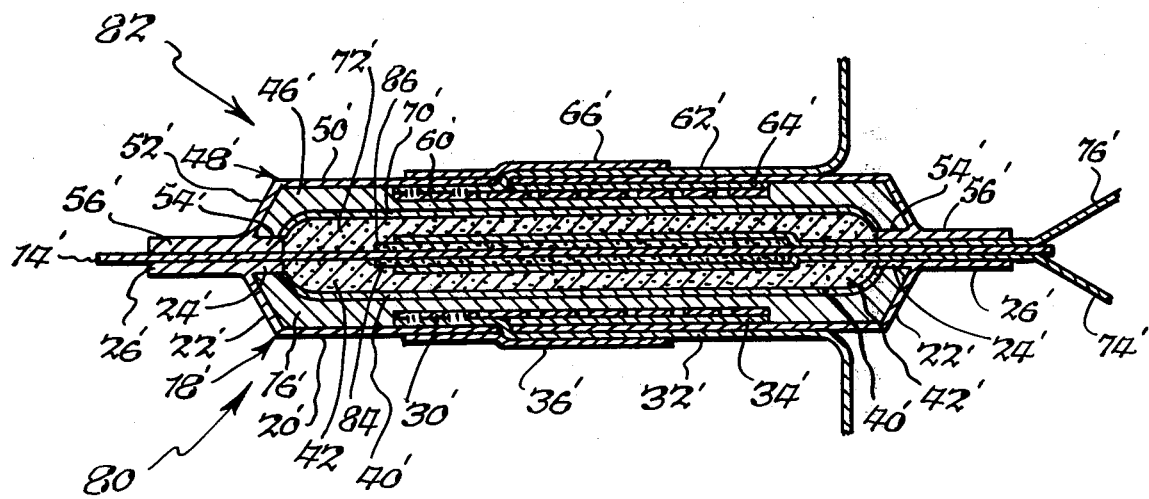

FIG. 2 shows a lithium-iodine battery according to another embodiment of the present invention. The battery includes a pair of lithium-iodine cells 80 and 82 similar to cells 10 and 12, respectively, in the battery of FIG. 1, and cells 80, 82 include many of the same components as cells 10, 12. In this connection, like components in the cells 80, 82 are identified by reference numerals which are the same as those in FIG. 1 but which have a prime superscript. In particular, cell 80 is identical to cell 10 with the exception of an additional component in the form of an iodine pellet 84 located between cathode current collector 74' and separator sheet 14'. Pellet 84 is relatively thin in the cell shown in FIG. 2, having opposite faces which contact sheet 14' and collector 74', and pellet 84 is of pure solid iodine. Similarly, cell 82 is identical to cell 12 with the exception of an additional component in the form of an iodine pellet 86 located between cathode current collector 76' and separator sheet 14'. Pellet 86 is relatively thin in the cell shown in FIG. 2, having opposite faces which contact sheet 14' and collector 76', and pellet 86 is of pure solid iodine. In each cell 80, 82 the current collector is on the face of the iodine pellet facing the lithium anode which is the front face in terms of the cell electronic activity being forwardly of the pellet, i.e., in the direction of the lithium anode. The lithium-iodine battery of FIG. 2 is fabricated in a manner identical to that of the battery of FIG. 1.

It is therefore apparent that the present invention accomplishes its intended objects. While several embodiments of the present invention have been described in detail, this is for the purpose of illustration, not limitation.

We claim:
1. A lithium-iodine battery comprising:
 (a) a pair of lithium-iodine cells each including a container element having a body portion defining an interior region therein, an opening communicating with said region and a continuous peripheral flange of heat sealable material around said opening extending outwardly from said body, a lithium anode element in said container, electrical conductor means operatively connected to said lithium anode element and extending from said container, cathode means comprising iodine-containing material in said container and operatively contacting said lithium anode, and electrical conductor means operatively connected to said cathode means and extending from said container through said opening across said peripheral flange;
 (b) a separator element having generally oppositely disposed surfaces and being of a material which is heat sealable and is non-reactive with iodine;
 (c) said containers being positioned on said opposite surfaces of said separator with said peripheral flanges of said containers contacting said surfaces and said cathode conductor means extending outwardly along said surfaces; and
 (d) said peripheral flanges of said containers and said separator element being heat sealed together around along the periphery of the assembly.

2. A battery according to claim 1, wherein each of said container elements is generally cup-shaped having a generally planar base portion and a rim portion extending from said base portion and disposed at about an acute angle, said peripheral flange extending outwardly from said rim portion.

3. A battery according to claim 1, wherein each of container elements has a continuous internal flange extending inwardly from said body portion into the interior thereof.

4. A battery according to claim 1, wherein each of said peripheral flanges of said container elements is disposed in a plane generally parallel to the plane of the opening in the corresponding one of said container elements.

5. A battery according to claim 1, wherein each of said container elements is of a material which does not exhibit electronic conduction when exposed to iodine.

6. A battery according to claim 1, wherein each of said lithium anode elements is positioned adjacent a surface of the interior region of the corresponding container element and wherein each of said anode electrical conductor means comprises a current collector element contacting the corresponding lithium element, said current collector element being positioned between the corresponding lithium element and the interior surface of the corresponding container element, and an electrical conductor lead connected at one end to the corresponding current collector element and extending outwardly through the corresponding container element.

7. A battery according to claim 6, wherein each of said container elements is of a material which is pressure bondable to lithium and further including an additional lithium element positioned between each of said current collectors and the interior surface of the corresponding container element, said lithium anode elements and said additional lithium elements being pressure bonded to the corresponding ones of said container elements in a manner embedding said current collector elements.

8. A battery according to claim 1, wherein each of said container elements is of a material which is pressure-bondable to lithium and is generally cup-shaped having a base portion, a rim portion extending from said base portion, and an internal flange portion extending inwardly from said rim portion, said peripheral flange extending outwardly from said rim portion and wherein each of said lithium elements is formed under pressure into the corresponding container element in a manner extending along the interior surfaces of said base and rim portions and abutting said internal flange portion.

9. A battery according to claim 1, wherein each of said lithium elements extends along the interior region of the corresponding one of said container elements and wherein each of said containers has an internal flange extending inwardly from said body portion into the interior thereof, said lithium elements contacting corresponding surfaces of said internal flanges in a manner sealing against flow of cathode material between said lithium elements and said flanges.

10. A battery according to claim 1, wherein said iodine-containing cathode material of each cell comprises a charge transfer complex of an organic donor component and iodine.

11. A battery according to claim 1, wherein said lithium anode element of each cell has a coating thereon and operatively associated with said cathode means of the corresponding cell, said coating being of an organic electron donor material.

12. A battery according to claim 1, wherein said separator element is generally planar in shape and relatively thin.

13. A battery according to claim 1, wherein each of said cathode conductor means comprises a current collector portion contacting said cathode material and a lead portion extending from said current collector portion and being of sufficient length to extend beyond said peripheral flange and said separator element for making electrical connection thereto.

14. A battery according to claim 1, wherein each cell further includes a solid element of pure iodine operatively contacting said cathode electrical conductor means.

15. A battery according to claim 1, wherein each cell further includes a solid element of pure iodine located between said current collector portion of said cathode conductor means and said separator element.

* * * * *